United States Patent
Abe et al.

(10) Patent No.: US 8,995,349 B2
(45) Date of Patent: Mar. 31, 2015

(54) COMMUNICATION CONTROL METHOD, MOBILE COMMUNICATION SYSTEM AND MOBILE TERMINAL APPARATUS

(75) Inventors: Tetsushi Abe, Tokyo (JP); Kazuaki Takeda, Tokyo (JP); Naoto Ookubo, Tokyo (JP); Hiroyuki Ishii, Tokyo (JP); Yuta Sagae, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 77 days.

(21) Appl. No.: 13/978,309

(22) PCT Filed: Jan. 5, 2012

(86) PCT No.: PCT/JP2012/050084
§ 371 (c)(1),
(2), (4) Date: Aug. 6, 2013

(87) PCT Pub. No.: WO2012/093686
PCT Pub. Date: Jul. 12, 2012

(65) Prior Publication Data
US 2013/0308540 A1    Nov. 21, 2013

(30) Foreign Application Priority Data

Jan. 7, 2011    (JP) ................................ 2011-002448
Feb. 14, 2011    (JP) ................................ 2011-029143

(51) Int. Cl.
*H04K 1/10*    (2006.01)
*H04L 1/00*    (2006.01)
*H04L 1/18*    (2006.01)

(52) U.S. Cl.
CPC ............ *H04L 1/0002* (2013.01); *H04L 1/0067* (2013.01); *H04L 1/1819* (2013.01); *H04L 1/1845* (2013.01)
USPC ........................................................ 370/328

(58) Field of Classification Search
USPC ......................................................... 370/328
See application file for complete search history.

(56) References Cited

U.S. PATENT DOCUMENTS 7,327,751 B2 *    2/2008    Matsuba et al. ............... 370/437
7,545,731 B2 *    6/2009    Agin et al. ..................... 370/204
(Continued)

FOREIGN PATENT DOCUMENTS

| JP | 2005-244674 A | 9/2005 |
| JP | 2007-124419 A | 5/2007 |
| JP | 2007-124485 A | 5/2007 |

OTHER PUBLICATIONS

International Search Report issued in PCT/JP2012/050084 mailed on Apr. 17, 2012 (8 pages).
(Continued)

*Primary Examiner* — Jay P Patel
(74) *Attorney, Agent, or Firm* — Osha Liang LLP

(57) ABSTRACT

The present invention is designated to reduce the deterioration of transmission characteristics upon data transmission, even when soft buffer memory for retransmission control is not sufficiently secured in a mobile terminal apparatus. The present invention provides the steps of, in a base station apparatus (eNB), performing channel coding of information bits (ST 802), performing a rate matching process for the coded bits after interleaving (ST 804), and transmitting transmission data to match the coded bit length after rate matching, to a mobile terminal apparatus (UE) (ST 806), and, in the mobile terminal apparatus (UE), receiving the transmission data (ST 807), performing channel decoding of the received data (ST 810), and discarding part of the received data in accordance with the size of the soft buffer memory in the mobile terminal apparatus (UE) and storing this in the soft buffer memory (ST 812 and ST 813).

21 Claims, 14 Drawing Sheets

(56) References Cited

U.S. PATENT DOCUMENTS

| | | | |
|---|---|---|---|
| 7,685,504 B2 | 3/2010 | Obuchi et al. | |
| 8,406,321 B2 | 3/2013 | Suzuki et al. | |
| 8,724,742 B2* | 5/2014 | Nimbalker et al. | 375/316 |
| 2002/0016883 A1* | 2/2002 | Musoll et al. | 711/100 |

OTHER PUBLICATIONS

Miyazaki, S. et al.; "A Retransmission scheme for IR H-ARQ with truncated soft buffer"; The Institute of Electronics, Information and Communication Engineers 2008 Nen Sogo Taikai Koen Ronbunshu, Mar. 18-21, 2008, p. 474 (1 page).

Nokia et al.; "Soft Buffer Allocation"; 3GPP TSG-RAN Working Group 1 #53, R1-081872; Kansas City, USA; May 5-9, 2008 (8 pages).

Patent Abstracts of Japan for Publication No. 2007-124485, Publication Date: May 17, 2007 (1 page).

Huawei et al.; "Soft buffer size allocation for Rel-10 downlink"; 3GPP TSG RAN WG1 Meeting #63, R1-106513; Jacksonville, USA; Nov. 15-19, 2010 (3 pages).

3GPP TS 36.212 V9.3.0; "3rd Generation Partnership Project; Technical Specification Group Radio Access Network; Evolved Universal Terrestrial Radio Access (E-UTRA); Multiplexing and channel coding (Release 9)"; Sep. 2010 (61 pages).

* cited by examiner

COMMUNICATION CONTROL METHOD, MOBILE COMMUNICATION SYSTEM AND MOBILE TERMINAL APPARATUS

TECHNICAL FIELD

The present invention relates to a communication control method, a mobile communication system and a mobile terminal apparatus. More particularly, the present invention relates to a communication control method, a mobile communication system and a mobile terminal apparatus to reduce the deterioration of transmission characteristics upon data transmission.

BACKGROUND ART

In a UMTS (Universal Mobile Telecommunications System) network, for the purposes of improving spectral efficiency and improving the data rates, system features based on W-CDMA (Wideband Code Division Multiple Access) are maximized by adopting HSDPA (High Speed Downlink Packet Access) and HSUPA (High Speed Uplink Packet Access). For this UMTS network, for the purposes of further increasing high-speed data rates, providing low delay and so on, long-term evolution (LTE) has been under study (see, for example, non-patent literature 1).

In the third-generation mobile communication system, it is possible to achieve a transmission rate of maximum approximately 2 Mbps on the downlink by using a fixed band of approximately 5 MHz. Meanwhile, in a system of the LTE scheme, it is possible to achieve a transmission rate of about maximum 300 Mbps on the downlink and about 75 Mbps on the uplink by using a variable band which ranges from 1.4 MHz to 20 MHz. Furthermore, in the UMTS network, for the purpose of achieving further broadbandization and higher speed, successor systems of LTE have been under study (for example, LTE-Advanced (LTE-A)). For example, in LTE-A, there is a plan to expand the 20-MHz maximum system band of LTE specification to approximately 100 MHz.

In a system of the LTE scheme (LTE system), there is a proposal to adopt hybrid ARQ (HARQ), which uses error correction (FEC: Forward Error Correction) and retransmission control (ARQ: Automatic Repeat reQuest) in combination (see, for example, non-patent literature 1). In this HARQ, it is possible to effectively cope with, for example, random errors on the mobile terminal apparatus UE side due to noise, by requesting retransmission of received data with an error, from the mobile terminal apparatus UE.

In particular, in the LTE system, there is a proposal to adopt HARQ, which involves soft combining. This HARQ to involve soft combining is a technique to achieve received data of high reliability by storing received data with an error in a buffer memory for retransmission control (to be more specific, an LLR (Log Likelihood Ratio) storage buffer memory) and combining this data with data that is retransmitted later (retransmission data).

CITATION LIST

Non-Patent Literature

Non-Patent Literature 1: 3GPP TS 36.212 "Multiplexing and Channel Coding

SUMMARY OF INVENTION

Technical Problem

In above-described hybrid ARQ to involve soft combining, it is possible to achieve received data of high reliability when sufficient buffer memory (soft buffer memory) for retransmission control is secured in the mobile terminal apparatus UE, and improve transmission characteristics upon data transmission. However, when sufficient soft buffer memory for retransmission control is not secured in the mobile terminal apparatus UE, the situation might occur where the transmission characteristics upon data transmission are deteriorated.

The present invention has been made in view of the above, and it is therefore an object of the present invention to provide a communication control method, a mobile communication system and a mobile terminal apparatus, whereby, even when sufficient soft buffer memory for retransmission control is not secured in a mobile terminal apparatus, it is still possible to reduce the deterioration of transmission characteristics upon data transmission.

Solution to Problem

The communication control method according to the present invention includes the steps of: in a base station apparatus: performing channel coding of information bits; performing a rate matching process of the coded bits after the channel coding; and transmitting transmission data to match a coded bit length after rate matching, to a mobile terminal apparatus; and in the mobile terminal apparatus: receiving the transmission data; performing channel decoding of the received data; and discarding part of the received data in accordance with a size of a soft buffer memory of the mobile terminal apparatus and storing in the soft buffer memory.

With the communication control method according to the present invention, part of coded bits constituting transmission data is prevented from being discarded in a base station apparatus. Consequently, in a mobile terminal apparatus, it is possible to improve transmission characteristics based on received data (coded bits) including these parity bits. As a result of this, even when sufficient soft buffer memory for retransmission control is not secured in the mobile terminal apparatus, it is still possible to reduce the deterioration of transmission characteristics upon data transmission.

Advantageous Effects of Invention

According to the present invention, even when sufficient soft buffer memory for retransmission control is not secured in a mobile terminal apparatus, it is still possible to reduce the deterioration of transmission characteristics upon data transmission.

DESCRIPTION OF EMBODIMENTS

Now, an embodiment of the present invention will be described below in detail with reference to the accompanying drawings. Note that, although the present invention will be embodied and explained hereinafter as a communication control method and as a mobile terminal apparatus UE and a base station apparatus eNB to adopt this communication control method, this is by no means limiting. Any mobile communication system to adopt the communication control method of the present invention or has a mobile terminal apparatus UE and a base station apparatus eNB adopting this communication control method is equally applicable.

Figure 1:
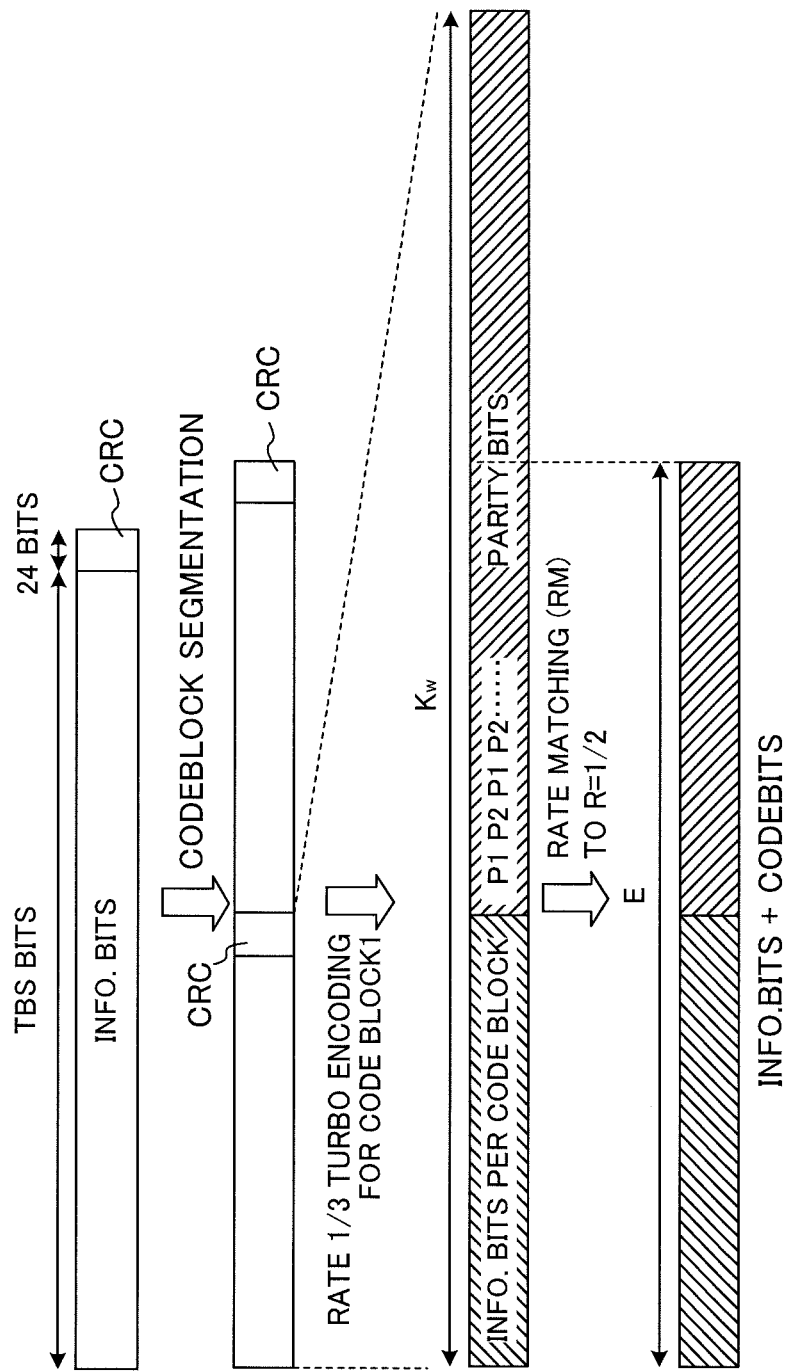
FIG. 1 is a diagram to explain processes in a base station apparatus of the LTE system upon data transmission.
Figure 2:
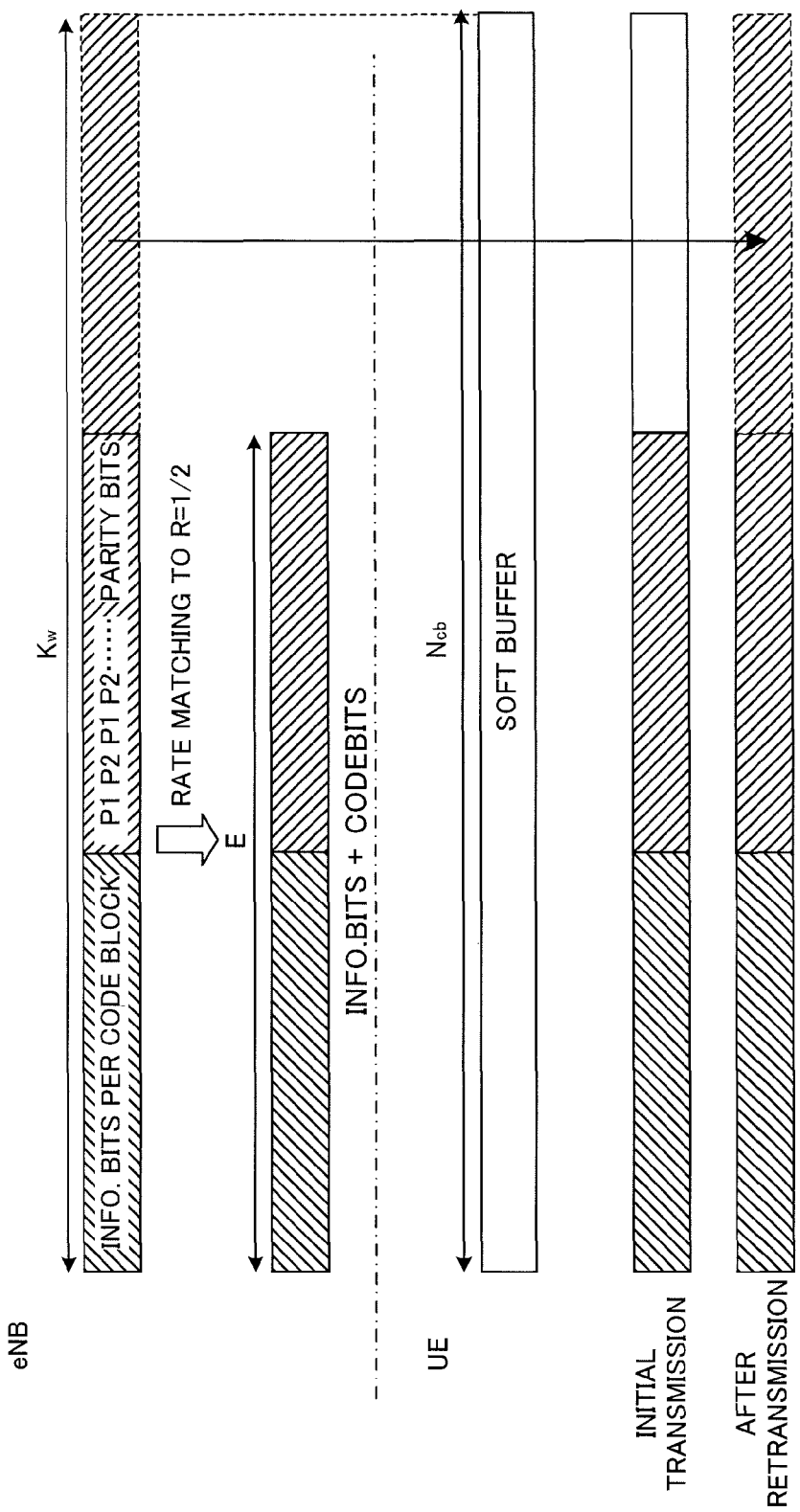
FIG. 2 is a diagram to explain processes in a base station apparatus and a mobile terminal apparatus of the LTE system upon data retransmission.
Figure 3:
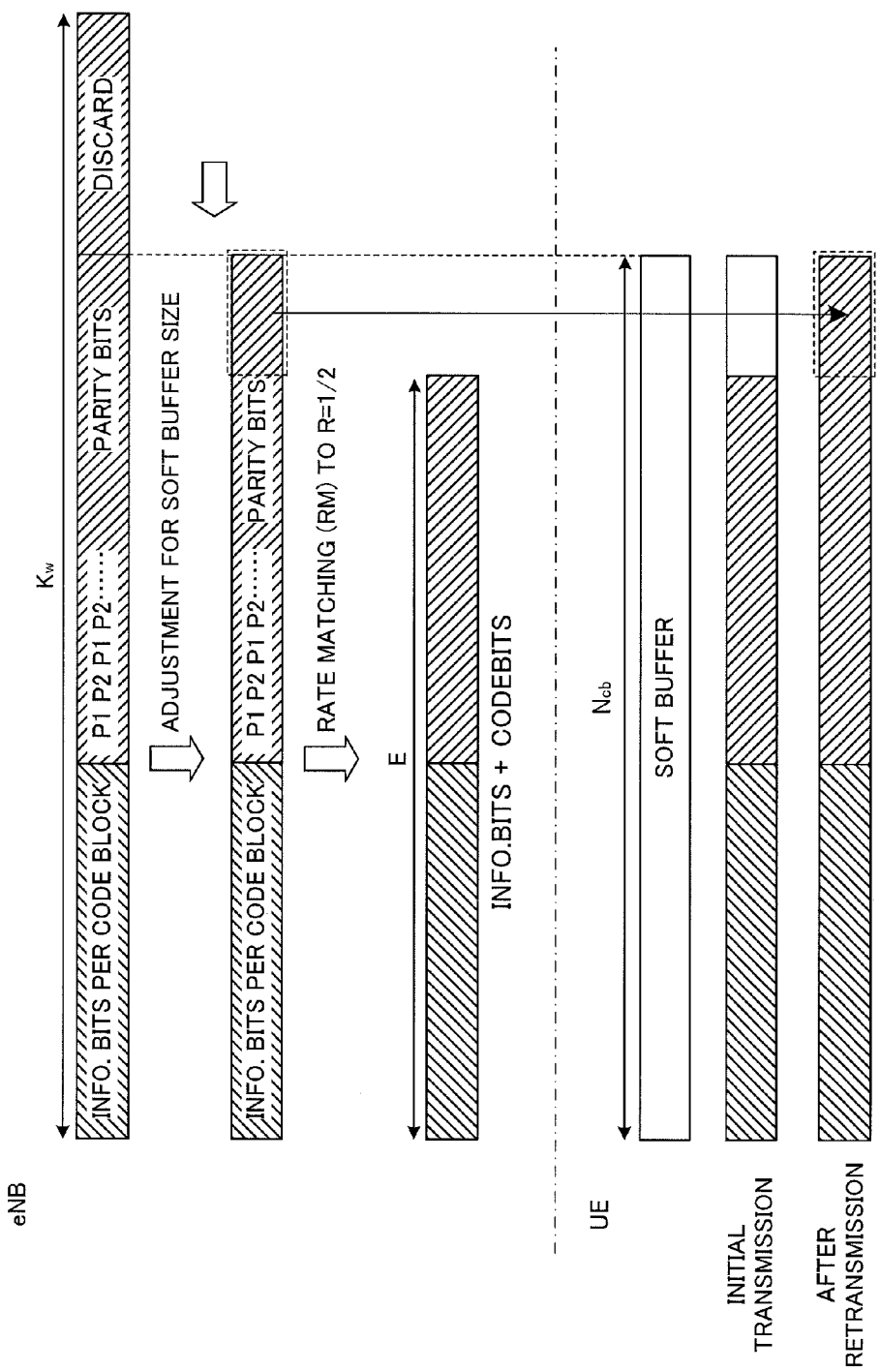
FIG. 3 is a diagram to explain processes in a base station apparatus and a mobile terminal apparatus of the LTE system upon data retransmission.
Figure 4:
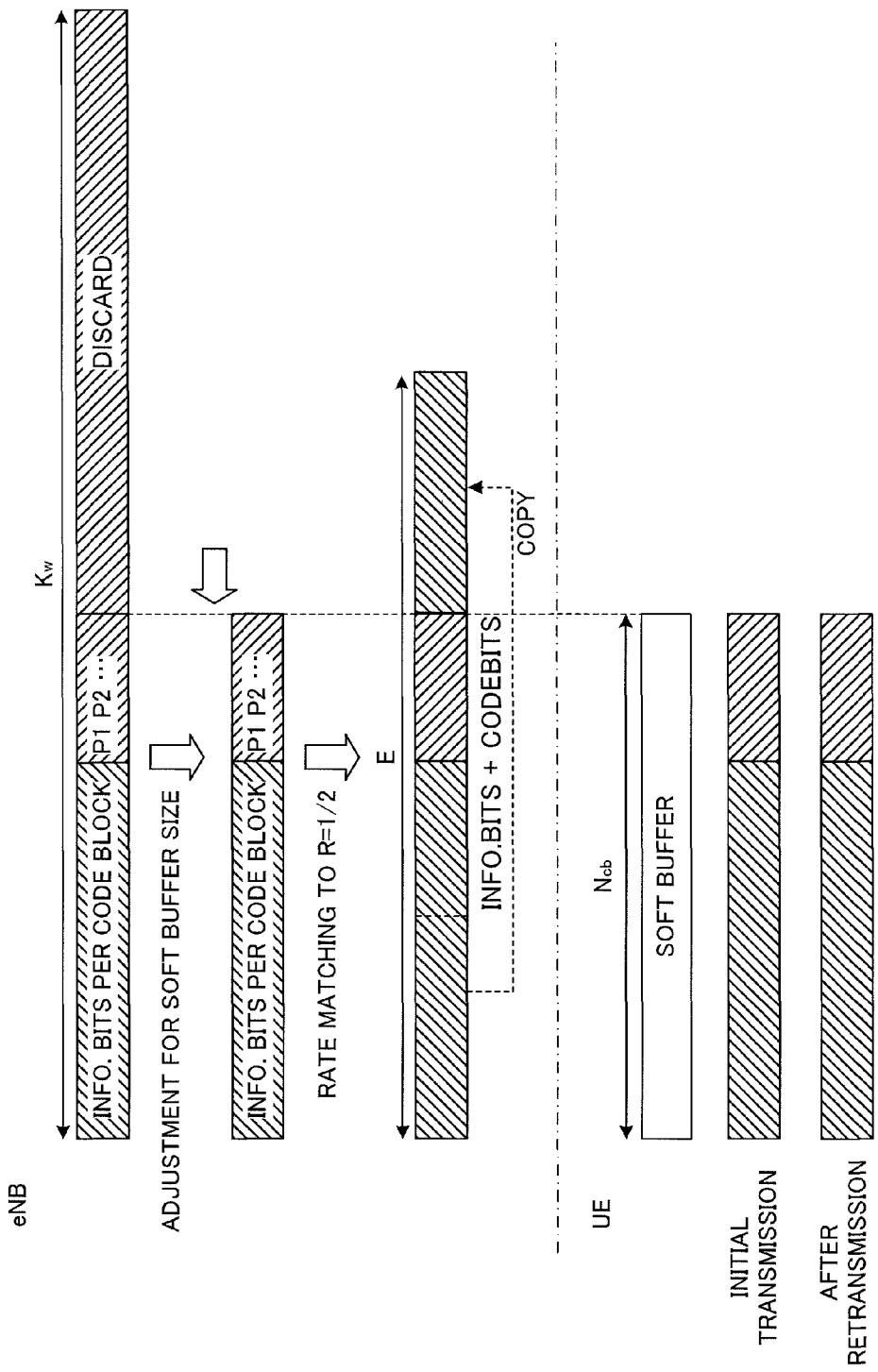
FIG. 4 is a diagram to explain processes in a base station apparatus and a mobile terminal apparatus of the LTE system upon data retransmission.

First, the processes in the LTE system upon data transmission will be described with reference to FIG. 1 to FIG. 4. FIG. 1 is a diagram to explain processes in a base station apparatus eNB of the LTE system upon data transmission. FIG. 2 to FIG. 4 are diagrams to explain processes in the base station apparatus eNB and a mobile terminal apparatus UE of the LTE system upon data retransmission. Note that FIG. 2 shows processes to be carried out when sufficient buffer memory (an LLR storage buffer memory, hereinafter referred to as "soft buffers") for retransmission control, in which received data with errors is stored, is secured in the mobile terminal apparatus UE, and FIG. 3 and FIG. 4 show processes to be carried out when sufficient soft buffers are not secured in the mobile terminal apparatus UE.

When transmitting data, the base station apparatus eNB first adds cyclic redundancy check (CRC) bits, which are 24-bit long, to information bits to match the size of a transport block (TBS), as shown in FIG. 1. By adding CRC bits, it is possible to detect whether or not there are errors with a transport block decoded on the mobile terminal apparatus UE side. Note that the decoding error detection result is used, for example, to trigger data retransmission by the downlink HARQ protocol.

Then, the base station apparatus eNB performs code block segmentation with respect to the information bits to which CRC bits have been added. By means of this code block segmentation, a transport block is segmented into a plurality of code blocks within a range of block length defined in a Turbo encoder. The base station apparatus eNB, upon performing the code block segmentation, adds 24-bit long CRC bits per code block. By adding CRC on a per code block basis, it is possible to detect errors of decoded code blocks early, and, as a result, finish the decoding process to involve a repetition process at early timing.

Next, the base station apparatus eNB performs channel coding for each code block to which CRC has been added. In this case, for each code block to which CRC has been added, Turbo encoding is performed at a coding rate of ⅓, and coded bits of a bit length $K_W$ are found. The coded bits having been subjected to channel coding include information bits (systematic bits) and parity bits (the first parity bit p1 and second parity bit p2) per code block.

Furthermore, the base station apparatus eNB performs a rate matching process with respect to the coded bits having been subjected to channel coding. In this case, rate matching by way of puncturing or repetition is applied to the parity bits for finer rate adjustment. Here, a rate matching process at a rate of ½ is performed to achieve coded bits of a bit length E. The coded bits having been subjected to rate matching are modulated by a predetermined modulation scheme, and, after that, transmitted to the mobile terminal apparatus UE on the downlink.

When data is transmitted from the base station apparatus eNB in this way, assume that an error is found with the received data in the mobile terminal apparatus UE. When HARQ to involve soft combining is adopted, the mobile terminal apparatus UE stores the received data with an error (initially transmitted received data) in soft buffers, as shown in FIG. 2. Then, retransmission of the received data with an error is requested from the mobile terminal apparatus UE.

As shown in FIG. 2, when soft buffers are secured sufficiently in the mobile terminal apparatus UE (to be more specific, when the soft buffer size $N_{cb}$ is equal to or greater than the bit length $K_W$ of the coded bits after channel coding (hereinafter "channel coding bit length $K_W$")) and a retransmission request is received from the mobile terminal apparatus UE, the base station apparatus eNB transmits part of the parity bits included in the coded bits after channel coding, as retransmission data. In this case, the retransmission data is stored in soft buffers in the mobile terminal apparatus UE (the received data after retransmission). In the mobile terminal apparatus UE, it is possible to achieve received data of high reliability by combining this retransmission data and the received data stored in soft buffers (initially transmitted received data).

Note that HARQ to involve soft combining is divided into CC (Chase Combining) and IR (Incremental Redundancy). CC refers to a scheme of transmitting, upon data retransmission, the same parity bits as the parity bits used upon the initial transmission. IR refers to a scheme of transmitting, upon data retransmission, different parity bits from the parity bits used upon the initial transmission. The parity bits to be retransmitted from the base station apparatus eNB in response to a retransmission request varies in accordance with the type of HARQ to involve soft combining.

Meanwhile, as shown in FIG. 3 and FIG. 4, when soft buffers are not sufficiently secured in the mobile terminal apparatus UE (to be more specific, when the soft buffer size $N_{cb}$ is smaller than the channel coding bit length $K_W$), the base station apparatus eNB performs a parity bit discarding process (Discarding process) prior to the rate matching process. In this discarding process, parity bits included in the coded bits after channel coding are discarded in accordance with the soft buffer size $N_{cb}$ secured in the mobile terminal apparatus UE. To be more specific, the portion of the parity bits to exceed the soft buffer size $N_{cb}$ is discarded. Note that the soft buffer size $N_{cb}$ is reported from the mobile terminal apparatus UE to the base station apparatus eNB, as part of capability information, when communication is started.

Here, the soft buffer size $N_{cb}$ in the mobile terminal apparatus UE is finite. Also, the soft buffer size $N_{cb}$ changes depending on the communication environment with the base station apparatus eNB. For example, the soft buffer size $N_{cb}$ may be divided in accordance with the number of HARQ processes (maximum eight processes) to be carried out between the mobile terminal apparatus UE and the base station apparatus eNB and the number of codewords (maximum two codewords) upon MIMO (Multi Input Multi Output) transmission. In such cases, the soft buffer size $N_{cb}$ is made smaller in accordance with the number of divisions. Also, as in the LTE-A system, when carrier aggregation is used to expand the transmission bandwidth, the soft buffer size $N_{cb}$ may be divided in accordance with the number of fundamental frequency blocks (hereinafter "component carriers") to be used for communication, and made even smaller.

FIG. 3 shows a case where the soft buffer size $N_{cb}$ in the mobile terminal apparatus UE is equal to or greater than the bit length E of the coded bits after rate matching (hereinafter referred to as "the coded bit length E after rate matching"). When the soft buffer size $N_{cb}$ is smaller than the channel coding bit length $K_W$ but is greater than the coded bit length E after rate matching, the transmission characteristics with the initial transmission data are maintained the same as when the soft buffer size $N_{cb}$ is equal to or greater than the channel coding bit length $K_W$ (the case shown in FIG. 2).

On the other hand, FIG. 4 shows a case where the soft buffer size $N_{cb}$ in the mobile terminal apparatus UE is smaller than the coded bit length E after rate matching. When the soft buffer size $N_{cb}$ is smaller than the coded bit length E after rate matching, part of the information bits is replicated by the repetition process in the rate matching. In this case, the coded bits after rate matching include part of the information bits in an overlapping manner. Then, transmission data to correspond to the coded bits, in which part of the information bits overlaps, is transmitted to the mobile terminal apparatus UE. In this case, given the decrease of the parity bits discarded, the transmission characteristics with the initial transmission data are deteriorated, compared to a case where the soft buffer size $N_{cb}$ is equal to or greater than the channel coding bit length $K_W$ (the case shown in FIG. 2).

In this way, when soft buffers are not sufficiently secured in the mobile terminal apparatus UE, part of the parity bits is discarded in the base station apparatus eNB in accordance with the soft buffer size $N_{cb}$. Note that, when the soft buffer size becomes even smaller, the information bits are also discarded accordingly. The parity bits discarded in the base station apparatus eNB are used in the mobile terminal apparatus UE, thereby contributing to improvement of transmission characteristics upon data transmission. The present inventors have focused on the fact that transmission characteristics upon data transmission are deteriorated as these parity bits are discarded in the base station apparatus eNB without being used in the mobile terminal apparatus UE, and have arrived at the present invention.

A gist of the present invention is that, in the base station apparatus eNB, coded bits after channel coding are not discarded in accordance with the soft buffer size $N_{cb}$, and transmission data to match the coded bit length E after rate matching is transmitted, and, in the mobile terminal apparatus UE, the transmission data is received and decoded, and, when an error is found with the received data, part of the received data is discarded in accordance with the soft buffer size $N_{cb}$ and stored in soft buffers. By this means, it is possible to prevent part of the parity bits from being discarded in the base station apparatus eNB in accordance with the soft buffer size $N_{cb}$, and improve the transmission characteristics in the mobile terminal apparatus UE based on these parity bits, so that, even when soft buffers are not sufficiently secured, it is still possible to reduce the deterioration of transmission characteristics upon data transmission.

Figure 5:
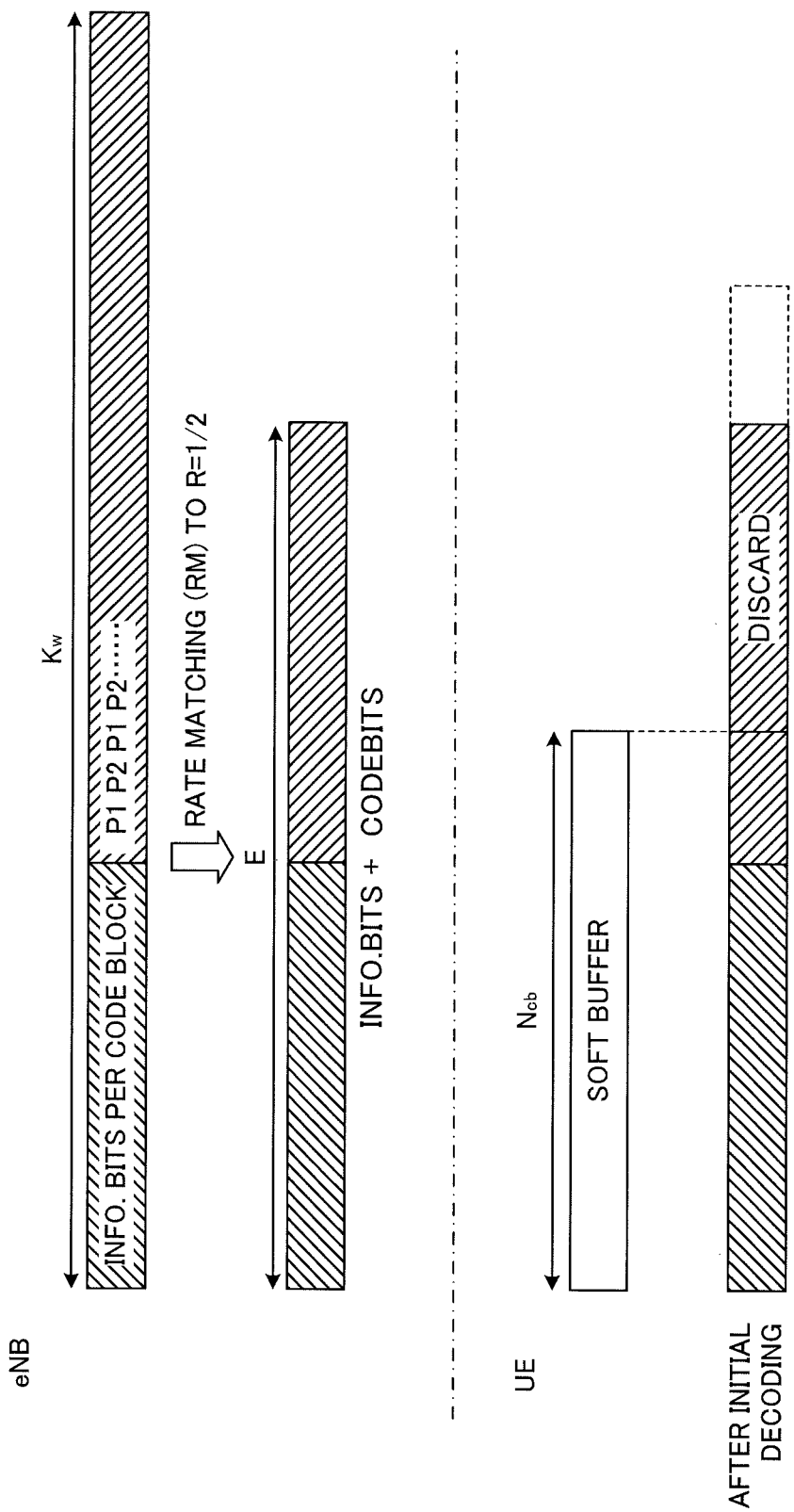
FIG. 5 is a diagram to explain processes of a communication control method according to the present embodiment upon data transmission.

FIG. 5 is a diagram to explain processes in communication control method according to the present embodiment upon data transmission. FIG. 5 shows to be carried out when sufficient soft buffer is not secured in the mobile terminal apparatus UE. In particular, FIG. 5 shows a case where the soft buffer size $N_{cb}$ in the mobile terminal apparatus UE is smaller than the coded bit length E after rate matching.

With the communication control method according to the present embodiment, the base station apparatus eNB does not perform a process to discard coded bits after channel coding prior to the rate matching process, regardless of the soft buffer size $N_{cb}$ in the mobile terminal apparatus UE. In this case, as shown in FIG. 2, as when soft buffers are secured sufficiently (to be more specific, when the soft buffer size $N_{cb}$ is equal to or greater than the channel coding bit length $K_W$), the base station apparatus eNB applies a rate matching process to the coded bits having been subjected to channel coding. Then, the base station apparatus eNB transmits transmission data to match the coded bit length E after rate matching, to the mobile terminal apparatus UE.

The mobile terminal apparatus UE receives and decodes this transmission data. In this case, the discarding process is not performed in the base station apparatus eNB. Consequently, the coded bits to constitute the received data do not include a replicate of part of the information bits, and include the same parity bits as when soft buffers are secured sufficiently. By decoding this received data in the mobile terminal apparatus UE, with the initial transmission data, it is possible to achieve the same transmission characteristics as when soft buffers are secured sufficiently. Consequently, in the mobile terminal apparatus UE, even when soft buffers are not sufficiently secured, it is still possible to reduce the deterioration of transmission characteristics upon data transmission. At this time, the mobile terminal apparatus UE calculates and stores the LLR of the transmitted coded bits using an instantaneous buffer.

When an error is found with the received data, the mobile terminal apparatus UE discards part of the received data according to the soft buffer size $N_{cb}$ and stores in soft buffers (discarding process). By this means, even when soft buffers are not sufficiently secured, it is still possible to store part of the received data in soft buffers adequately as when the discarding process is performed in the base station apparatus eNB. When retransmission data is transmitted from the base station apparatus eNB in response to a retransmission request from the mobile terminal apparatus UE, the mobile terminal apparatus UE combines the retransmission data and the received data stored in soft buffers.

Figure 6:
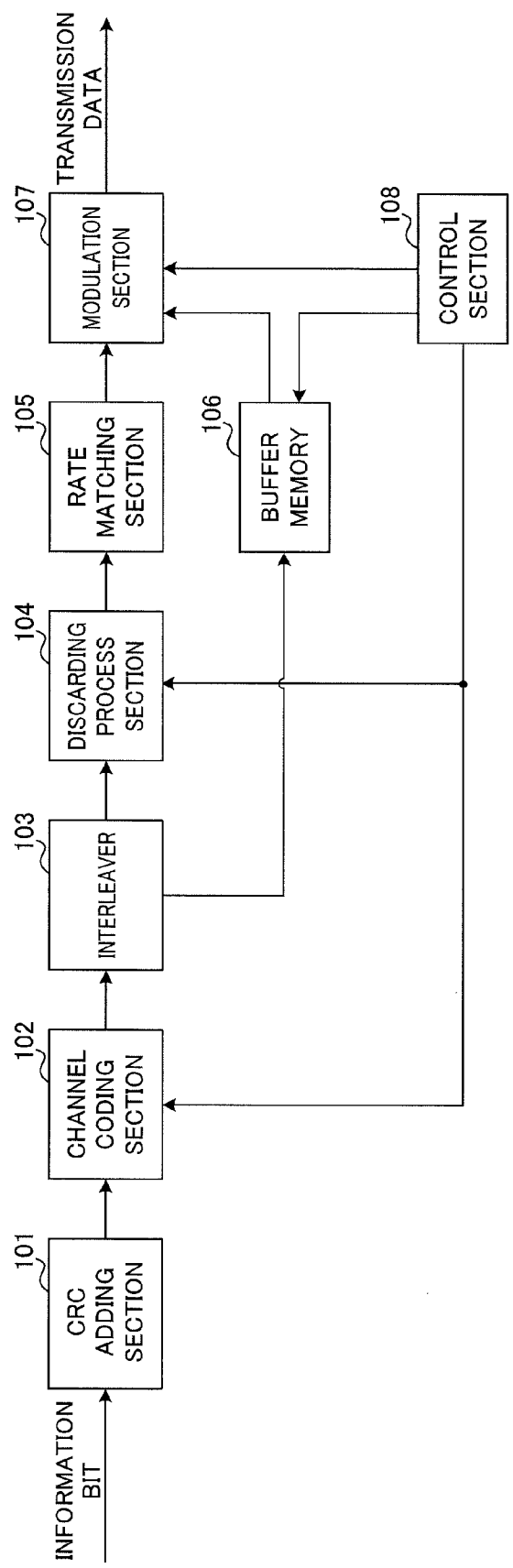
FIG. 6 is a block diagram showing a configuration of a base station apparatus adopting the communication control method according to the present embodiment.

FIG. 6 is a block diagram showing a configuration of a base station apparatus eNB adopting the communication control method according to the present embodiment. Note that the base station apparatus eNB shown in FIG. 6 is simplified in order to explain the communication control method according to the present invention, but is presumed to have configurations which a base station apparatus eNB used in the LTE system or LTE-A system normally has.

As shown in FIG. 6, the base station apparatus eNB is configured to include a CRC adding section 101, a channel coding section 102, an interleaver 103, a discarding process section 104, a rate matching section 105, a buffer memory 106, a modulation section 107, and a control section 108. The base station apparatus eNB shown in FIG. 6 performs processes required for data transmission or data retransmission shown in FIG. 1 to FIG. 4, under the control of the control section 108. In particular, the base station apparatus eNB shown in FIG. 6 switches between performing and not performing the discarding process of coded bits after channel coding, depending on the capacity of the communicating mobile terminal apparatus UE, under the control of the control section 108.

The CRC adding section 101 adds CRC bits for error check in packet data units, to information bits that are input. Here, CRC bits that are 24-bit long are added to the information bits. Also, the CRC adding section 101 adds CRC bits per code block after code block segmentation.

The channel coding section 102 encodes packet data including CRC bits, using a predetermined coding scheme, at a predetermined coding rate. To be more specific, the channel coding section 102 performs Turbo encoding at a coding rate of ⅓, and acquires coded bits. The packet data is encoded into systematic bits, and parity bits which are error control bits for the systematic bits. Note that the coding rate to be used in the channel coding section 102 is given from the control section 108. Although a case will be described here where Turbo encoding of a coding rate 1/3 is used, it is equally possible to use other coding rates and other coding schemes as well.

The interleaver 103 rearranges the order of the coded bits after channel coding randomly (interleaving process). The interleaving process is executed to minimize the data transmission loss due to burst errors. Note that the interleaved coded bits are stored in the buffer memory 106 for retransmission. When a retransmission request is received from the mobile terminal apparatus UE, under the control of the control section 108, part or all of the transmission packets stored in the buffer memory 106 is output to the modulation section 107.

The discarding process section 104 discards part of the coded bits (parity bits). For example, when the mobile terminal apparatus UE supports only the Rel. 8 LTE system and soft buffers are not sufficiently secured in the mobile terminal apparatus UE, part of the coded bits after channel coding is discard (see FIG. 3 and FIG. 4). On the other hand, when the mobile terminal apparatus UE supports the communication control method according to the present invention, the discarding process section 104 does not perform the discarding process of coded bits after channel coding. In this case, whether or not the discarding process section 104 performs the discarding process is determined in accordance with commands from the control section 108. That is to say, whether or not the discarding process is executed is switched in accordance with capability information (including the soft buffer size) of the mobile terminal apparatus UE, given from the control section 108.

The rate matching section 105 performs rate matching of the coded bits by performing repetition and puncturing for the coded bits. For example, the rate matching section 105 performs puncturing when the coded bit length $K_W$ after channel coding is greater than the coded bit length E after rate matching (see FIG. 3 and FIG. 5). On the other hand, the rate matching section 105 performs repetition when the coded bit length $K_W$ after channel coding is smaller than the coded bit length E after rate matching (see FIG. 4).

The modulation section 107 modulates the coded bits input from the rate matching section 105 (or the buffer memory 106) by a predetermined modulation scheme. Note that the modulation scheme used in the modulation section 107 is given from the control section 108. The modulation scheme may be, for example, QPSK (Quadrature Phase Shift Keying), 8PSK, 16QAM (Quadrature Amplitude Modulation), and 64QAM. The coded bits modulated by the modulation section 107 are transmitted to the mobile terminal apparatus UE on the downlink as transmission data.

The control section 108 controls the overall operations of the base station apparatus eNB. For example, the control section 108 determines the coding rate in the channel coding section 102 and the modulation scheme in the modulation section 107 according to the current radio channel state. Also, the control section 108 determines whether or not the discarding process section 103 performs the discarding process according to the capability information (including the soft buffer size) reported from the mobile terminal apparatus UE when communication is started. Furthermore, the control section 108 performs retransmission control in accordance with response signals (ACK/NACK) transmitted from the mobile terminal apparatus UE. When a response signal ACK (Acknowledge) is received, corresponding transmission packets in the buffer memory 106 are removed. On the other hand, when a response signal NACK (Non-Acknowledge) is received, part or all of the corresponding transmission packets in the buffer memory 106 is extracted and retransmitted to the mobile terminal apparatus UE via the modulation section 107.

Figure 7:
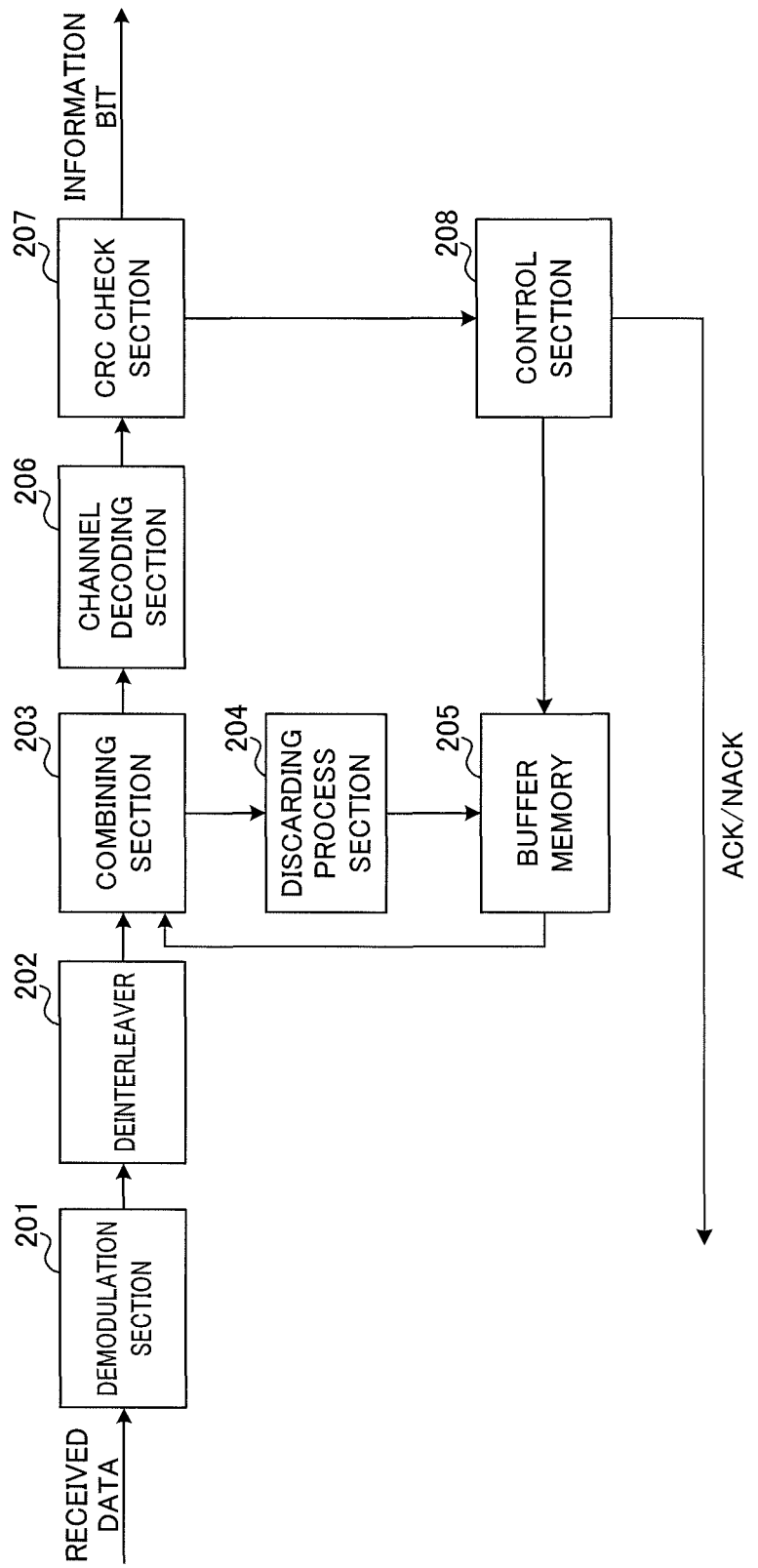
FIG. 7 is a block diagram showing a configuration of a mobile terminal apparatus adopting the communication control method according to the present embodiment.

FIG. 7 is a block diagram showing a configuration of the mobile terminal apparatus UE adopting the communication control method according to the present embodiment. Note that the mobile terminal apparatus UE shown in FIG. 7 is simplified in order to simplify the communication control method according to the present invention, but is presumed to have configurations which a mobile terminal apparatus UE used in the LTE system or LTE-A system normally has.

As shown in FIG. 7, the mobile terminal apparatus UE is configured to include a demodulation section 201, a deinterleaver 202, a combining section 203, a discarding process section 204, a buffer memory 205, a channel decoding section 206, a CRC check section 207, and a control section 208. The mobile terminal apparatus UE shown in FIG. 7 discards part of received data and stores this in soft buffers, under the control of the control section 208, as shown in FIG. 5.

The demodulation section 201 demodulates the data received from the base station apparatus eNB (received data). In this case, the demodulation section 201 demodulates the received data by a demodulation scheme corresponding to the modulation scheme used in the modulation section 107 of the base station apparatus eNB. By this means, the coded bits included in the received data are found.

The deinterleaver 202 performs a deinterleaving process with respect to the coded bits input from the demodulation section 201. In this case, the deinterleaver 202 performs the deinterleaving process by a deinterleaving method corresponding to the interleaving method in the interleaver 104 of the base station apparatus eNB.

The combining section 203 combines the coded bits of the same packets as stored in the buffer memory 205, with the currently received coded bits. When there are no coded bits of the same packets as stored in the buffer memory 205, that is, upon the initial transmission, the combining section 203 outputs the currently received coded bits to the discarding process section 204 and the channel decoding section 206.

The discarding process section 204 discards part of the coded bits from the combining section 203. The discarding process section 204 discards part of the coded bits from the combining section 203, according to the soft buffer size set in part or all of the buffer memory 205. To be more specific, the discarding process section 204 discards part of the portion of the coded bits to exceed the soft buffer size (parity bits). Note that, when the soft buffer size is equal to or greater than the coded bit length from the combining section 203, part of the coded bit is not discarded.

In the soft buffer (buffer memory 205), the partly discarded coded bits are stored in the discarding process section 204. Also, coded bits that are not subject to the discarding process in the discarding process section 204 are also stored. The coded bits that are stored are used to be combined with coded bits that are received again, in the combining section 203. In this way, when coded bits of a greater soft buffer size are received, part of the coded bits is discarded in the discarding process section 204, and stored in soft buffers. Consequently, even when sufficient soft buffers are not secured in the mobile terminal apparatus UE, it is still possible to store part of received data (coded bits) in soft buffers adequately, as when the discarding process is performed in the base station apparatus eNB.

The channel decoding section 206 reconstructs the coded bits from the combining section 203 by performing decoding by a predetermined decoding scheme. In this case, the channel decoding section 206 uses a Turbo decoding scheme corresponding to the coding scheme in the channel coding section 102 of the base station apparatus eNB. By decoding the coded bits from the combining section 203 by a Turbo decoding scheme, the information bits are reconstructed based on the systematic bits and the parity bits.

The CRC check section 207 extracts the CRC bits from the decoded information bits in packet units. Then, whether or not a packet has an error is determined using the extracted CRC bits. The result determined in the CRC check section 207 is output from the control section 208. The information bits in the packet determined not to have an error by the CRC check section 207 are output to an upper layer.

The control section 208 controls the overall operations of the mobile terminal apparatus UE. For example, when, according to the result of determination in the CRC check section 207, a packet has no error, the control section 208 transmits a response signal ACK, which acknowledges reception of the packet, to the base station apparatus eNB. On the other hand, when a packet has an error, the control section 208 transmits a response signal NACK to the base station apparatus eNB. When transmitting a response signal ACK, the control section 208 initializes the soft buffers. In this case, the coded bits in the soft buffers corresponding to the packet are removed. On the other hand, when transmitting a response signal NACK, the soft buffers are not initialized. In this case, the coded bits in the soft buffers corresponding to the packet are retained.

Figure 8:
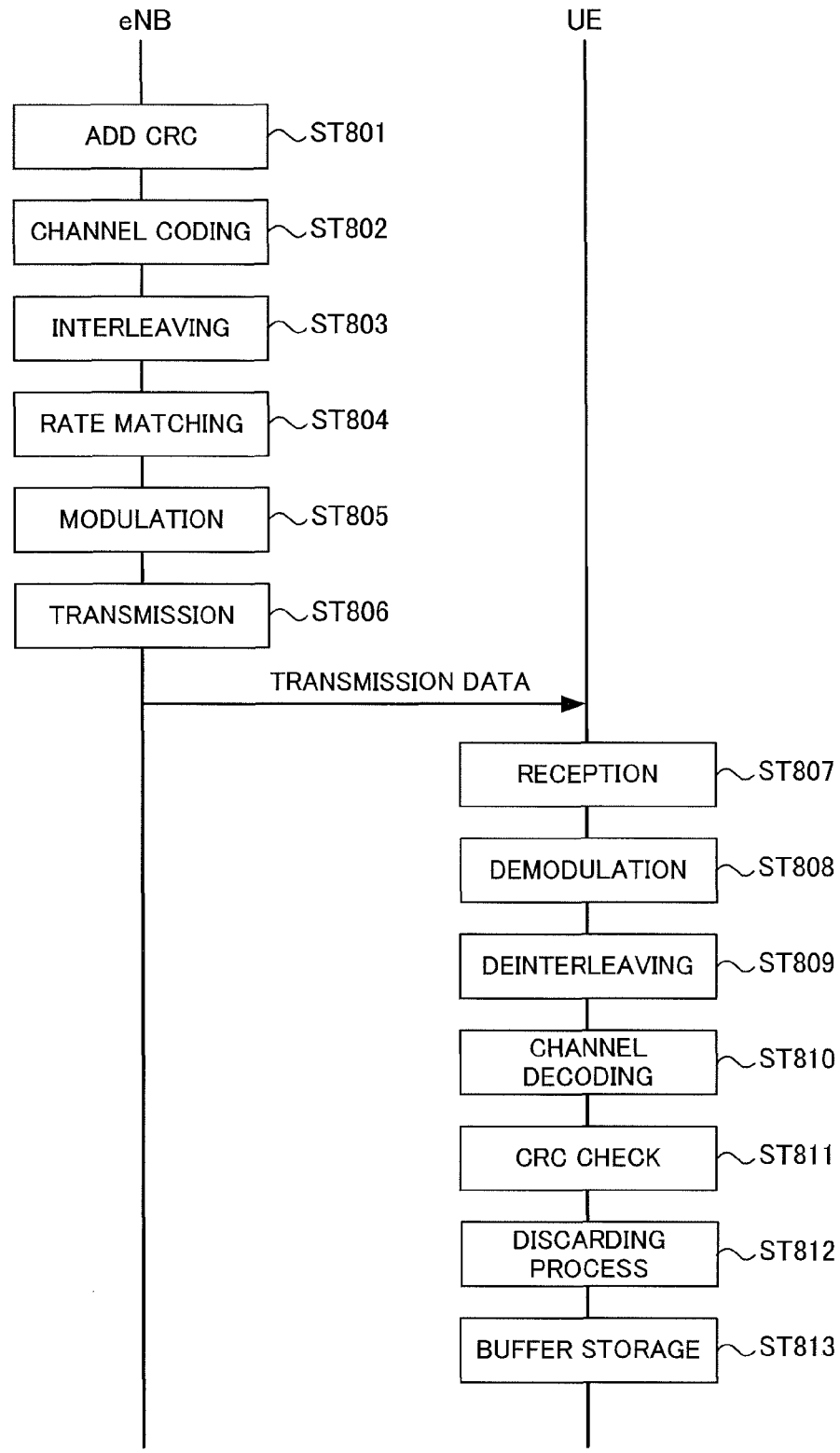
FIG. 8 is a sequence diagram of the communication control method according to the present embodiment upon data transmission.

FIG. 8 is a sequence diagram of the communication control method according to the present embodiment upon data transmission. Assume that, in FIG. 8, the mobile terminal apparatus UE supports the present communication control method. Also, assume that, in the mobile terminal apparatus UE, the soft buffer size is smaller than the coded bit length E after rate matching. Furthermore, FIG. 8 shows processes to be carried out upon the initial transmission of data from the base station apparatus eNB to the mobile terminal apparatus UE.

As shown in FIG. 8, when information bits are input, the CRC adding section 101 adds CRC bits for error check in packet data units (step ST 801). When packet data including CRC bits is received from the CRC adding section 101, the channel coding section 102 performs channel coding by a Turbo coding scheme of a coding rate 1/3, and acquires coded bits (step ST 802).

The interleaver 103 rearranges (interleaves) the order of the coded bits after rate matching randomly (step ST 803). The interleaved coded bits are stored in the buffer memory 106 for retransmission, but are omitted in FIG. 8. The rate matching section 105 performs rate matching with respect to the coded bits after interleaving (step ST 804). In this case, the mobile terminal apparatus UE supports the present communication control method, so that the discarding process section 104 does not perform a process of discarding the coded bits. Consequently, as shown in FIG. 4, the coded bits after rate matching do not include information bits in an overlapping manner. As shown in FIG. 2, the coded bits after rate matching include the same parity bits as when soft buffers are secured sufficiently.

The modulation section 107 modulates the coded bits input from the interleaver 103 (or the buffer memory 106) by a predetermined modulation scheme (step ST 805). The coded bits modulated by the modulation section 107 are transmitted on the downlink to the mobile terminal apparatus UE, as transmission data (step ST 806).

The transmission data from the base station apparatus eNB is received in the mobile terminal apparatus UE (step ST 807). The demodulation section 201 demodulates this received data (step ST 808). In this case, the received data is demodulated by a demodulation scheme corresponding to the modulation scheme used in the modulation section 107 of the base station apparatus eNB. The deinterleaver 202 performs a deinterleaving process with respect to the demodulated coded bits (step ST 809).

The deinterleaved coded bits are output to the combining section 203. Here, the transmission data from the base station apparatus eNB is initially transmitted data, so that coded bits to correspond to the same packets are not stored in the buffer memory (soft buffers) 205. The channel decoding section 206 reconstructs the coded bits from the combining section 203 by performing the decoding by a predetermined decoding scheme (step ST 810). In this case, the coded bits are subject to channel decoding by a Turbo decoding scheme corresponding to the coding scheme in the channel coding section 102 of the base station apparatus eNB. By this means, the information bits included in the transmission data are reconstructed.

In the CRC check section 207, the CRC bits are extracted, in packet units, from the reconstructed information bits. Then, whether or not a packet has an error is determined using the extracted CRC bits (CRC check: step ST 811). The information bits in the packet that is determined not to have an error by the CRC check section 207 are output to an upper layer.

In parallel with the channel decoding process of ST 810, coded bits are output from the combining section 203 to the discarding process section 204. The discarding process section 204 discards part of these coded bits (step ST 812). In this case, given that the soft buffer size is smaller than the coded bit length E after rate matching, part of the portion of the coded bits to exceed the soft buffer size (parity bits) is discarded. Then, the partly discarded coded bits are stored in the buffer memory (soft buffers) 205 (step ST 813).

In this way, with the communication control method according to the present embodiment, it is possible to prevent part of the coded bits to constitute transmission data from being discarded in the base station apparatus eNB. Consequently, in the mobile terminal apparatus UE, it is possible to improve transmission characteristics based on received data (coded bits) including these parity bits. As a result, in the mobile terminal apparatus UE, even when soft buffers are not sufficiently secured, it is still possible to reduce the deterioration of transmission characteristics upon data transmission.

When the initial transmission is carried out following the sequence shown in FIG. 8 and an error is found with the received data, retransmission of the transmission data is requested by transmitting a NACK response signal from the mobile terminal apparatus UE to the base station apparatus eNB. Meanwhile, the coded bits stored in the buffer memory 205 are retained.

When the retransmission request is received, the base station apparatus eNB retransmits the corresponding transmission data from the buffer memory 106. The retransmission data is output to the combining section 203, via the demodulation process and the deinterleaving process, as with the initially transmitted transmission data. The combining section 203 combines the coded bits of this retransmission data and coded bits corresponding to the received data stored in the buffer memory (soft buffers) 205. Then, the coded bits after the combining are output as information bits via channel decoding and CRC check. Note that, when an error is found with the retransmission data, the same retransmission control is repeated.

Generally, when executing retransmission control, the base station apparatus eNB may use a scheme to retransmit the same bit sequence as in the previous transmission (for example, CC (Chase Combining)), or may use a scheme to retransmit a different bit sequence from the previous transmission (for example, IR (Incremental Redundancy)). Normally, a single transmission scheme is used in each retransmission event. When a common transmission scheme repeats being used, data transmission characteristics are unlikely to improve.

Consequently, with the communication control method according to the present embodiment, when retransmission control is executed, the transmission scheme for parity bits is switched in a plurality of number of times. That is to say, when retransmission control has been executed a predetermined number of times in CC, the transmission scheme for parity bits is switched to IR, and retransmission control is executed. On the other hand, when retransmission control has been executed a predetermined number of times in IR, the transmission scheme for parity bits is switched to CC, and retransmission control is executed.

By switching the transmission scheme for parity bits in a predetermined number of times in this way, the mobile terminal apparatus UE is able to combine coded bits to correspond to received data using a plurality of parity bits. As a result of this, compared to the case of repeating using the same transmission scheme for parity bits, it is possible to improve the transmission characteristics upon data retransmission.

The transmission scheme for parity bits is switched in the control section 108. That is to say, in this case, the control section 108 functions as a switching section. In this case, the control section 108 switches the transmission scheme for parity bits based on the coded bits after channel coding stored in the buffer memory 106. To be more specific, by switching the parity bits to be selected as retransmission data among the parity bits included in the coded bits after channel coding, the transmission scheme for parity bits is switched.

Figure 9:
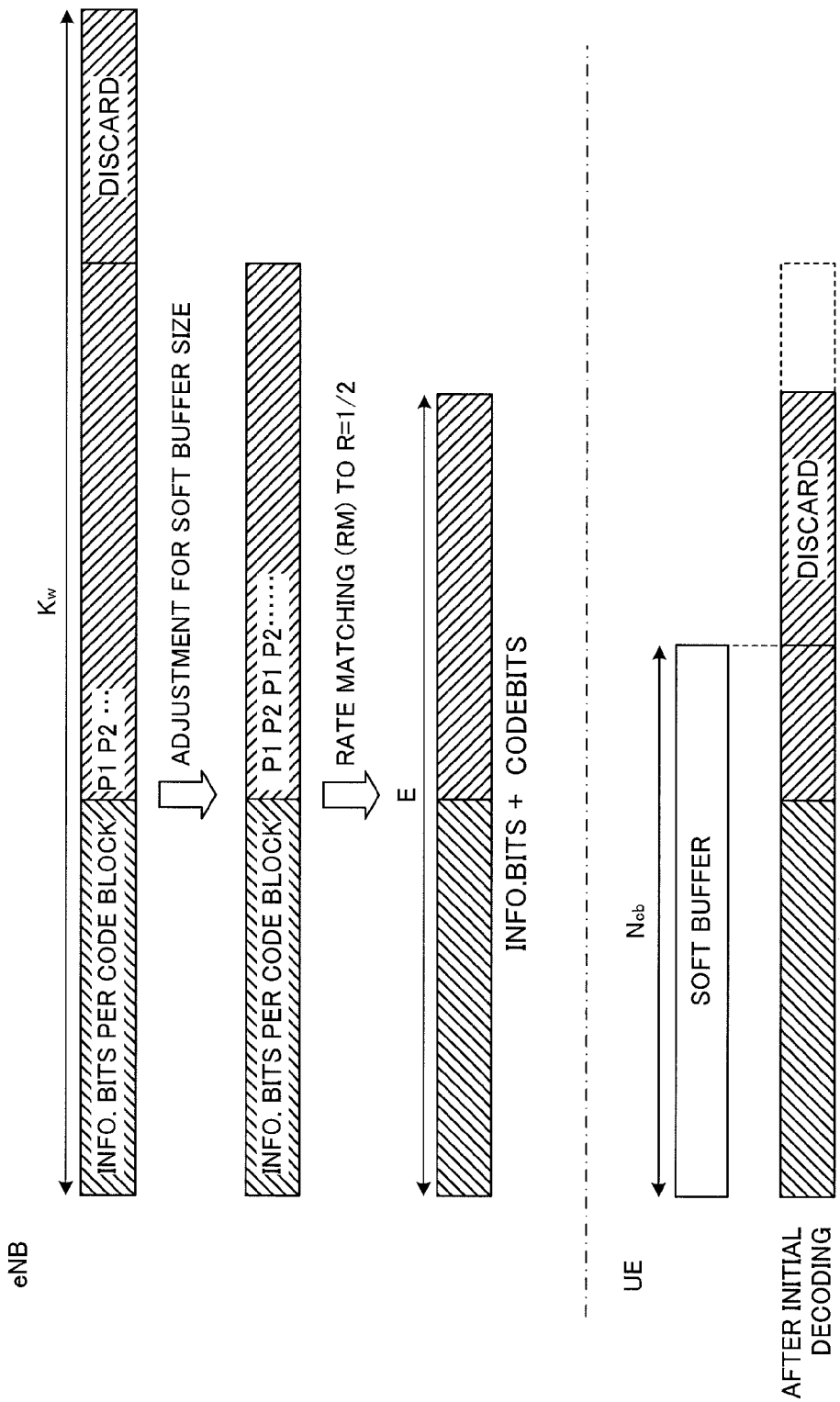
FIG. 9 is a diagram to explain processes of a communication control method according to the first modified example upon data transmission.

FIG. 9 is a diagram to explain processes of the communication control method according to the first modified example of the present embodiment, upon data transmission. As in FIG. 5, FIG. 9 shows processes to be carried out when sufficient soft buffers are secured in the mobile terminal apparatus UE. In particular, FIG. 9 shows a case where the soft buffer size $N_{cb}$ in the mobile terminal apparatus UE is smaller than the coded bit length E after rate matching.

With the communication control method according to the first modified example, the base station apparatus eNB performs a process of discarding a certain amount of coded bits after channel coding, prior to the rate matching process, regardless of the soft buffer size $N_{cb}$ in the mobile terminal apparatus UE. That is to say, in a mobile communication system to use for a mobile terminal apparatus that is capable of transmission and reception in a plurality of component carriers, the above certain amount of coded bits is determined by the size of the soft buffer memory of a mobile terminal apparatus that is capable of transmission and reception in a single component carrier alone, regardless of the number of component carriers. However, the base station apparatus eNB performs a discarding process within a range in which the coded bit length after the discarding process exceeds the coded bit length E after rate matching. For example, the base station apparatus eNB performs the discarding process in accordance with the LTE specifications defined in Release 8 (hereinafter "Rel. 8 LTE"). In this case, the discarding process is applied to the coded bits after channel coding, in accordance with the soft buffer size $N_{cb}$ corresponding to a single component carrier, regardless of the number of component carriers actually used in the mobile terminal apparatus UE. By this means, there is an advantage that the base station processes of Rel. 8 LTE can be used.

Next, the base station apparatus eNB applies the rate matching process to the partly discarded coded bits after channel coding. Then, the base station apparatus eNB transmits transmission data to match the coded bit length E after rate matching, to the mobile terminal apparatus UE.

The mobile terminal apparatus UE receives and decodes this transmission data E. In this case, in the base station apparatus eNB, the discarding process is performed regardless of the soft buffer size $N_{cb}$, and, furthermore, the discarding process is executed within a range in which the coded bit length after the discarding process exceeds the coded bit length E after rate matching. Consequently, the coded bits to constitute the received data do not include a replicate of part of the information bits, and include the same parity bits as when soft buffers are secured sufficiently. By decoding this received data in the mobile terminal apparatus UE, with the initial transmission data, it is possible to achieve the same transmission characteristics as when soft buffers are secured sufficiently. Consequently, in the mobile terminal apparatus UE, even when soft buffers are not sufficiently secured, it is still possible to reduce the deterioration of transmission characteristics upon data transmission.

When an error is found with the received data, the mobile terminal apparatus UE discards part of the received data according to the soft buffer size $N_{cb}$ and stores this in soft buffers (discarding process). By this means, even when soft buffers are not sufficiently secured, it is still possible to store part of the received data in soft buffers adequately as when the discarding process is performed in the base station apparatus eNB. When retransmission data is transmitted from the base station apparatus eNB in response to a retransmission request from the mobile terminal apparatus UE, the mobile terminal apparatus UE combines the retransmission data and the received data stored in soft buffers.

Figure 10:
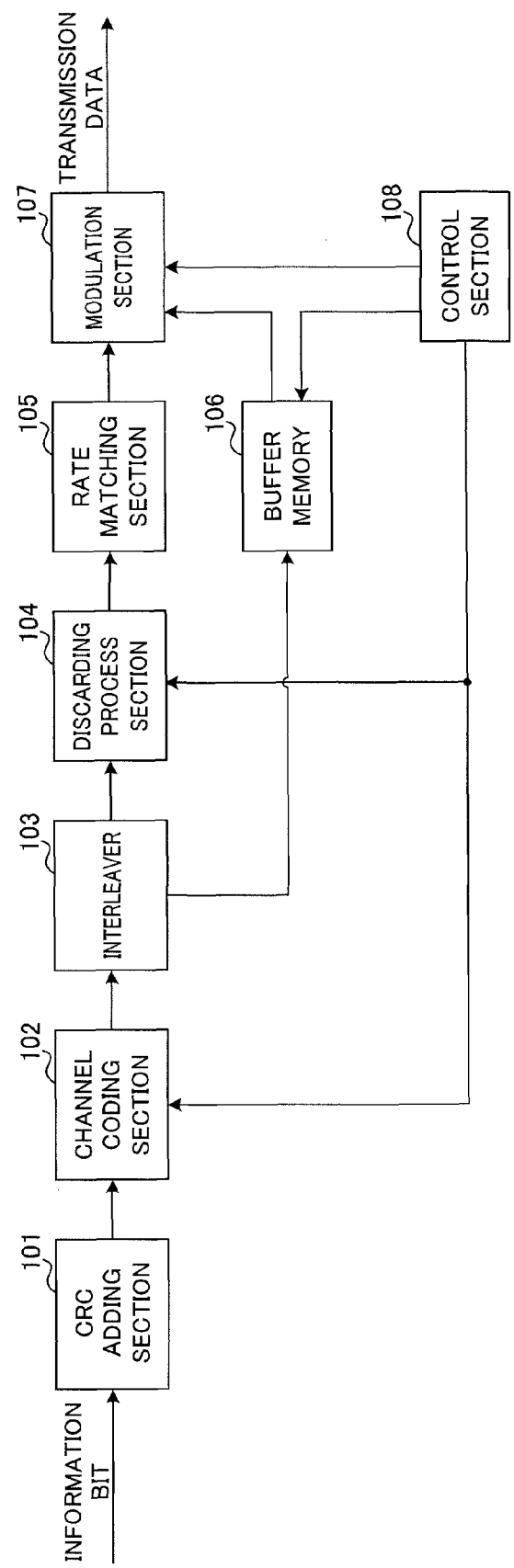
FIG. 10 is a block diagram to show a configuration of a base station apparatus adopting the communication control method according to the first modified example.

FIG. 10 is a block diagram to show a configuration of a base station apparatus eNB adopting the communication control method according to the first modified example. Note that, like the base station apparatus eNB according to the above embodiment shown in FIG. 6, the base station apparatus eNB shown in FIG. 10 is presumed to have configurations which a base station apparatus eNB used in the LTE system or LTE-A system normally has. Note that the mobile terminal apparatus UE to adopt the communication control method according to the first modified example is common with the mobile terminal apparatus UE (FIG. 7) according to the above embodiment, and therefore its explanation will be omitted.

The base station apparatus eNB shown in FIG. 10 is different from the base station apparatus eNB according to the above embodiment in having a discarding process section 104A. Note that parts in the base station apparatus eNB shown in FIG. 10 that are common with the base station apparatus eNB (FIG. 6) according to the above embodiment will be assigned the same reference numerals and their explanations will be omitted.

The discarding process section 104A is different from the discarding process section 104 according to the above embodiment, in discarding a certain amount of coded bits after channel coding when the mobile terminal apparatus UE supports the communication control method according to the first modified example and soft buffers are not sufficiently secured in the mobile terminal apparatus UE. The discarding process section 104A performs the discarding process within a range in which the coded bit length after the discarding process exceeds the coded bit length E after rate matching.

To be more specific, the discarding process section 104A performs the discarding process in accordance with the specifications of LTE defined in Release8 (hereinafter "Rel. 8 LTE"). In this case, the discarding process section 104A applies the discarding process to the coded bits after channel coding, in accordance with the soft buffer size corresponding to a single component carrier. When the discarding process is applied in accordance with the soft buffer size to correspond to a single component carrier, the coded bit length after the discarding process does not become smaller than the coded bit length E after rate matching.

If a plurality of component carriers are used in communication, the soft buffer size of the mobile terminal apparatus UE is reduced in accordance with the number of component carriers. Following this, the situation may be possible where the soft buffer size becomes smaller than the coded bit length E after rate matching. The discarding process section 104A performs the discarding process in accordance with the soft buffer size corresponding to a single component carrier, even when a plurality of component carriers are used in communication. By this means, it is possible to reliably prevent the coded bit length after the discarding process from becoming smaller than the coded bit length E after rate matching. Consequently, the coded bits to constitute the data received in the mobile terminal apparatus UE (received data) do not include a replicate of part of the information bits, and include the same parity bits as when soft buffers are secured sufficiently. By decoding this received data in the mobile terminal apparatus UE, with the initial transmission data, it is possible to achieve the same transmission characteristics as when soft buffers are secured sufficiently. Consequently, in the mobile terminal apparatus UE, even when soft buffers are not sufficiently secured, it is still possible to reduce the deterioration of transmission characteristics upon data transmission. Also, since the specifications of the Rel. 8 LTE system can be used, it is not necessary to define new control.

Note that, like the discarding process section 103 according to the above embodiment, the discarding process section 104A has, for example, a function to discard part of coded bits after channel coding when the mobile terminal apparatus UE supports only the Rel. 8 LTE system and soft buffers are not sufficiently secured in the mobile terminal apparatus UE (see FIG. 3 and FIG. 4). In this case, the discarding process section 104A switches the discarding process in accordance with commands from the control section 108. That is to say, the discarding process is switched in accordance with the capability information (including the soft buffer size) of the mobile terminal apparatus UE, given from the control section 108.

The above-described communication control method according to the present embodiment and the communication control method according to the first modified example are presumed to make use of the soft buffers set in the buffer memory 205 of the mobile terminal apparatus UE. However, from the perspective of effectively using the buffer memory 205 in which soft buffers are set, further modification is possible. Now, a second modified example to effectively use the buffer memory 205 in which soft buffers are set will be described below.

Figure 11:
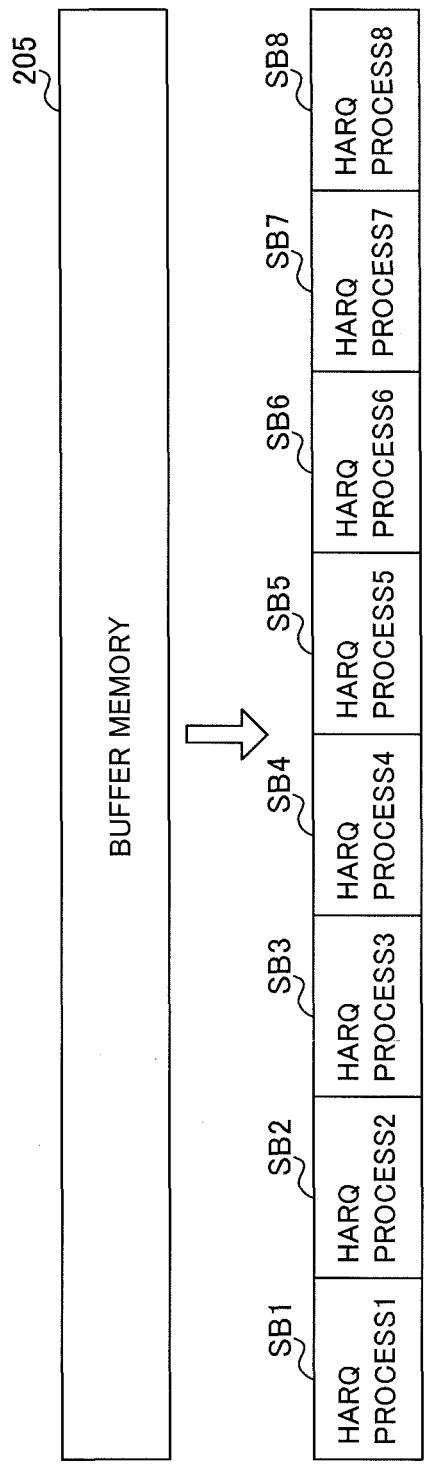
FIG. 11 is a diagram to explain soft buffers to be set in a buffer memory when the number of HARQ processes is eight.

As described above, the soft buffer size in the mobile terminal apparatus UE is segmented in accordance with, for example, the number of HARQ processes (maximum eight processes) to be carried out between the mobile terminal apparatus UE and the base station apparatus eNB, and so on. FIG. 11 is a diagram to explain the soft buffers set in the buffer memory 205 when the number of HARQ processes is eight. In this case, the buffer memory 205 is segmented into eight soft buffers SB 1 to SB 8, in accordance with the HARQ processes (HARQ process 1 to HARQ process 8), as shown in FIG. 11. Note that the soft buffer size to match the number of HARQ processes is signaled to the mobile terminal apparatus UE to which persistent resources are allocated, via a call setting process.

However, even when the buffer memory 205 is segmented in this way, in the actual retransmission control, not all of the soft buffers SB 1 to SB 8 are necessarily used. The retransmission control largely depends on the radio channel state, and the number of soft buffers to be required may change. Consequently, even when the buffer memory 205 is segmented as shown in FIG. 11, in the actual retransmission control, oftentimes, only part of the soft buffers is used (see FIG. 12A). For example, since the soft buffers are necessary to combine packets upon retransmission control, it is possible to reduce the amount of buffers to use by storing only HARQ processes where errors are found, in the soft buffers.

With the communication control method according to the second modified example of the present embodiment, the state of use of a plurality of soft buffers set in the buffer memory 205 is monitored in the mobile terminal apparatus UE, and, in accordance with this state of use, the memory area (to be more specific, soft buffers) to store part of received data is changed. For example, with the communication control method according to the second modified example, part of received data is stored in a plurality of soft buffers, including soft buffers that are not used in retransmission control, among a plurality of soft buffers set in the buffer memory 205. By this means, without being limited to a single soft buffer that is segmented, it is possible to effectively use a plurality of soft buffers, and thereby improve the transmission characteristics of data transmission.

Figure 12:
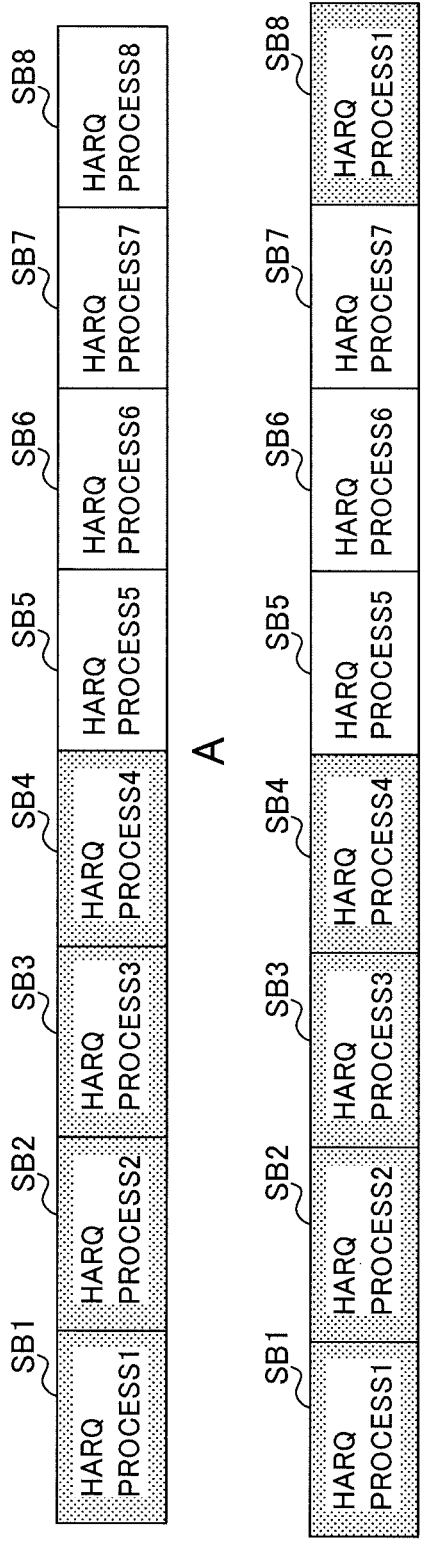
FIG. 12 is a diagram to explain an example of a case where received data is processed by a communication control method according to a second modified example.

FIG. 12 is a diagram to explain an example of a case where received data is processed by the communication control method according to the second modified example. FIG. 12A shows a case where, among the eight soft buffers SB 1 to SB 8 set in the buffer memory 205, part of (four) the soft buffers SB 1 to SB 4 are used in the actual retransmission control. That is to say, the rest of the soft buffers SB 5 to SB 8 are not used and are in a state of waiting for use in retransmission control.

With the communication control method according to the second modified example, as shown in FIG. 12A, received data is processed using the soft buffers SB 5 to SB 8 that are not used in the actual retransmission control. For example, as shown in FIG. 12B, the soft buffer SB 8 for HARQ process 8 is temporarily used as the soft buffer for HARQ process 1. In this case, even when part of received data cannot be stored in the soft buffer SB 1 that is originally for HARQ process 1, that part can be stored in the soft buffer SB 8 for HARQ process 8. As a result of this, it is possible to process received data from the base station apparatus eNB flexibly.

Figure 13:
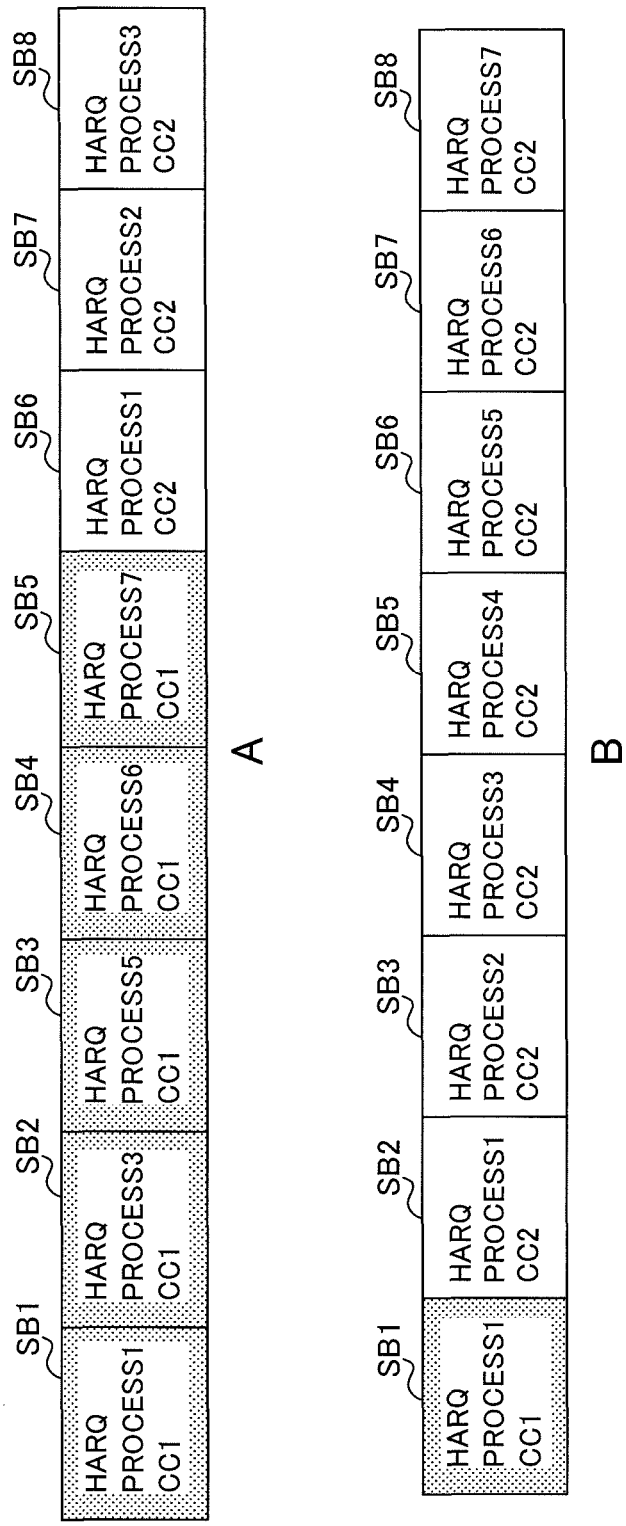
FIG. 13 is a diagram to explain another example of a case where received data is processed by the communication control method according to the second modified example.

FIG. 13 is a diagram to explain another example of a case where received data is processed by a communication control method according to the second modified example. With the communication control method according to the second modified example, as shown in FIG. 13, the eight soft buffers SB 1 to SB 8, set in the buffer memory 205, are shared and managed between a plurality of component carriers (two component carriers in FIG. 13). Also, in the soft buffers SB 1 to SB 8, only the HARQ processes where an error is found in each component carrier are assigned.

For example, when an error is found in HARQ processes 1, 3 and 5 to 7, in the first component carrier (CC 1), and an error is found in HARQ processes 1 to 3, in a second component carrier (CC 2), as shown in FIG. 13A, the HARQ processes where an error is found are assigned to the soft buffers SB 1 to SB 8. The buffers of processes where ACK is issued upon retransmission are emptied out, and are assigned to other processes where an error is found. After that, upon transition to the situation where an error is found in HARQ process 1 in the first component carrier (CC 1) and an error is found in HARQ processes 1 to 7 in the second component carrier (CC 2), as shown in FIG. 13B, the HARQ processes where an error is found are assigned to the soft buffers SB 1 to SB 8. Note that, when, in a plurality of component carriers to be used in communication, an error is found in more than eight HARQ process, the packet is not stored in the buffer memory 205 and is discarded. By sharing and managing soft buffers between a plurality of component carriers in this way, it is possible to use limited soft memory effectively and improve the transmission characteristics of data transmission.

Figure 14:
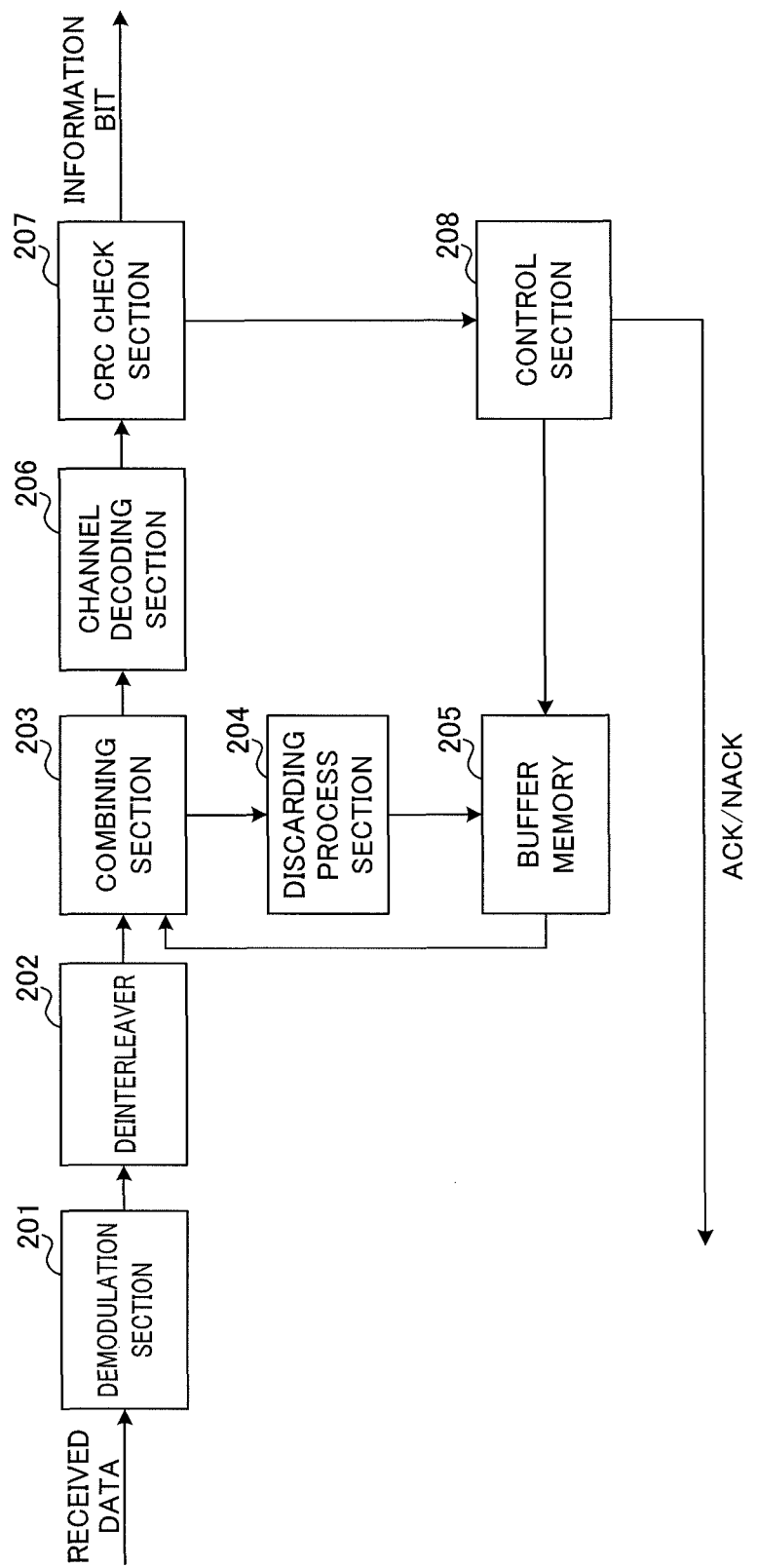
FIG. 14 is a block diagram to show a configuration of a mobile terminal apparatus adopting the communication control method according to the second modified example.

FIG. 14 is a block diagram to show a configuration of a mobile terminal apparatus UE adopting the communication control method according to the second modified example. Note that, similar to the mobile terminal apparatus UE according to the above embodiment shown in FIG. 7, the mobile terminal apparatus UE shown in FIG. 14 is presumed to have configurations which a mobile terminal apparatus UE used in the LTE system or the LTE-A system normally has. Note that the base station apparatus eNB to be applied to the communication control method according to the second modified example is common to the base station apparatus eNB (FIG. 6 and FIG. 10) according to the above embodiment or the first modified example, and therefore its explanation will be omitted.

The mobile terminal apparatus UE shown in FIG. 14 is different from the mobile terminal apparatus UE according to the above embodiment in having a control section 208A. Note that configurations in the mobile terminal apparatus UE shown in FIG. 14 that are common with the mobile terminal apparatus UE (FIG. 7) according to the above embodiment will be assigned the same codes and their explanations will be omitted.

The control section 208A has, in addition to the function of the control section 208 of the mobile terminal apparatus UE according to the above embodiment, the management functions of the buffer memory 205 that are required in the communication control method according to the second modified example (hereinafter "memory management functions"). Here, the memory management functions include the first function of managing the soft buffers to be used in retransmission control and the soft buffers to be used in retransmission control, among a plurality of soft buffers set in the buffer memory 205. Also, the memory management functions include a second function of assigning soft buffers for HARQ processes that are not used in retransmission control, to other soft buffers for HARQ processes. Furthermore, the memory management functions include a third function of allowing the soft buffers for HARQ process, assigned to other soft buffers for HARQ process by the second function, to resume being the original soft buffer for HARQ processes. Furthermore, the memory management functions include a fourth function of controlling the operation (discarding process) of the discarding process section 204 when soft buffers for HARQ processes that are not used in retransmission control are assigned to other soft buffers for HARQ processes by the second function.

With the communication control method according to the second modified example, the mobile terminal apparatus UE processes received data using a plurality of soft buffers including soft buffers that are not used in retransmission control, among a plurality of soft buffers that are set in the buffer memory 205. By this means, without being limited to a single soft buffer that is segmented, it is possible to effectively use a plurality of soft buffers, so that it is possible to process received data from the base station apparatus eNB flexibly and improve the transmission characteristics of data transmission. In particular, when a plurality of soft buffers set in the buffer memory 205 are shared between a plurality of component carriers, it is possible to use the soft buffers effectively and further improve the transmission characteristics of data transmission.

Note that the communication control method according to the second modified example can be combined with the communication control method according to the above embodiment or the first modified example, as follows. For example, when there are soft buffers that are not actually used in retransmission control, received data may be processed using a plurality of soft buffers, by the communication control method according to the second modified example, and, when there are no soft buffers that are not actually used in retransmission control, a discarding process may be performed on the mobile terminal apparatus UE side using a single soft buffer, by the communication control method according to the above embodiment or the first modified example. By such combination, it is possible to use the buffer memory 205 effectively and improve data transmission characteristics.

Now, although the present invention has been described in detail with reference to the above embodiment, it should be obvious to a person skilled in the art that the present invention is by no means limited to the embodiments described in this specification. The present invention can be implemented with various corrections and in various modifications, without departing from the spirit and scope of the present invention defined by the recitations of the claims. Consequently, the descriptions in this specification are provided only for the purpose of explaining examples, and should by no means be construed to limit the present invention in any way.

The disclosures of Japanese Patent Application No. 2011-002448, filed on Jan. 7, 2011, and Japanese Patent Application No. 2011-029143, filed on Feb. 14, 2011, including the specifications, drawings and abstracts, are incorporated herein by reference in their entirety.

The invention claimed is:

1. A communication control method for a base station apparatus and a mobile terminal apparatus which are capable of transmission and reception in a plurality of component carriers, comprising the steps of:
in the base station apparatus:
performing channel coding of information bits;
performing a rate matching process of the coded bits after the channel coding; and
transmitting transmission data to match a coded bit length after rate matching, to the mobile terminal apparatus; and
in the mobile terminal apparatus:
receiving the transmission data;
performing channel decoding of the received data; and
when an error is found with the received data, storing part of the received data in a soft buffer memory of the mobile terminal apparatus in accordance with a size of the soft buffer memory,
wherein the base station apparatus determines a coded bit length after the channel coding by the size of the soft buffer memory of a mobile terminal apparatus which is capable of transmission and reception in a single component carrier alone, regardless of the number of component carriers.

2. The communication control method according to claim 1, wherein, in the base station apparatus, the rate matching process is performed, without discarding the coded bits after the channel coding in accordance with the size of the soft buffer memory.

3. The communication control method according to claim 1, further comprising a step of retransmitting the transmission data when the base station apparatus receives a retransmission request for the received data from the mobile terminal apparatus,
wherein chase combining and incremental redundancy, which are transmission schemes for parity bits, are switched according to the number of times of retransmissions of the transmission data.

4. The communication control method according to claim 1, wherein the base station apparatus discards a certain amount of the coded bits after the channel coding in accordance with the size of the soft buffer memory of the mobile terminal apparatus which is capable of transmission and reception in the single component carrier.

5. The communication control method according to claim 4, further comprising a step of retransmitting the transmission data when the base station apparatus receives a retransmission request for the received data from the mobile terminal apparatus,
wherein chase combining and incremental redundancy, which are transmission schemes for parity bits, are switched according to the number of times of retransmissions of the transmission data.

6. The communication control method according to claim 4, wherein, when the error is found with the received data, the mobile terminal apparatus discards the part of the received data in accordance with the size of the soft buffer memory.

7. The communication control method according to claim 4, wherein, in the base station apparatus, the rate matching process is performed, without discarding the coded bits after the channel coding in accordance with the size of the soft buffer memory.

8. The communication control method according to claim 1, wherein, when the error is found with the received data, the mobile terminal apparatus discards the part of the received data in accordance with the size of the soft buffer memory.

9. A mobile communication system comprising a base station apparatus and a mobile terminal apparatus which are capable of transmission and reception in a plurality of component carriers,
the base station apparatus comprising:
a channel coding section that performs channel coding of information bits;
a rate matching section that performs a rate matching process of the coded bits after channel coding; and
a transmission section that transmits transmission data to match a coded bit length after rate matching, to the mobile terminal apparatus; and
the mobile terminal apparatus comprising:
a receiving section that receives the transmission data;
a channel decoding section that performs channel decoding of the received data; and
a process section that stores part of the received data in a soft buffer memory of the mobile terminal apparatus in accordance with a size of the soft buffer memory, when an error is found with the received data,
wherein the base station apparatus determines a coded bit length after the channel coding by the size of the soft buffer memory of a mobile terminal apparatus which is capable of transmission and reception in a single component carrier alone, regardless of the number of component carriers.

10. The mobile communication system according to claim 9, wherein the base station apparatus further comprises a discarding process section that discards a certain amount of the coded bits after the channel coding, prior to the rate matching process, in accordance with the size of the soft buffer memory of the mobile terminal apparatus which is capable of transmission and reception in the single component carrier.

11. The mobile communication system according to claim 10, wherein, when the base station apparatus receives a retransmission request for the received data from the mobile terminal apparatus, chase combining and incremental redundancy, which are transmission schemes for parity bits, are switched according to the number of times of retransmissions of the transmission data.

12. The mobile terminal apparatus according to claim 10, wherein, when the error is found with the received data, the process section discards the part of the received data in accordance with the size of the soft buffer memory.

13. The mobile terminal apparatus according to claim 9, wherein, when the error is found with the received data, the process section discards the part of the received data in accordance with the size of the soft buffer memory.

14. A mobile terminal apparatus which is capable of transmission and reception in a plurality of component carriers, comprising:
a receiving section that receives transmission data from a base station apparatus;
a channel decoding section that performs channel decoding of received data; and
a process section that stores part or all of the received data in a soft buffer memory of the mobile terminal apparatus in accordance with a size of the soft buffer memory, when an error is found with the received data,
wherein the transmission data from the base station apparatus is transmission data to match a coded bit length obtained by performing channel coding of information bits and performing a rate matching process of the coded bits after channel coding, and a coded bit length after the channel coding is determined by the size of the soft buffer memory of a mobile terminal apparatus which is capable of transmission and reception in a single component carrier alone, regardless of the number of component carriers.

15. The mobile terminal apparatus according to claim 14, wherein, when the error is found with the received data from the base station apparatus, the process section discards the part of the received data in accordance with the size of the soft buffer memory.

16. The mobile terminal apparatus according to claim 15, further comprising a control section that monitors a state of use of the soft buffer memory and changes an area to store part of all of the received data in accordance with the state of use.

17. The mobile terminal apparatus according to claim 16, wherein the control section, when receiving the transmission data from the base station apparatus in a plurality of component carriers, shares the soft buffer memory between the plurality of component carriers.

18. The mobile terminal apparatus according to claim 17, wherein the control section assigns received data to correspond to an HARQ process where an error is found in a first component carrier and received data to correspond to an HARQ process where an error is found in a second component carrier, to the soft buffer memory.

19. The mobile terminal apparatus according to claim 16, wherein the control section controls an operation of the process section in accordance with the area to store part of the received data.

20. A base station apparatus which is capable of transmission and reception with a mobile terminal apparatus in a single component carrier alone or in a plurality of component carriers, comprising:

a channel coding section that performs channel coding of information bits;

a rate matching section that performs a rate matching process of the coded bits after channel coding; and a transmission section that transmits transmission data to match a coded bit length after rate matching, to a mobile terminal apparatus, wherein the base station apparatus determines a coded bit length after the channel coding by a size of a soft buffer memory of a mobile terminal apparatus which is capable of transmission and reception in the single component carrier alone, regardless of the number of component carriers.

21. The base station apparatus according to claim 20, wherein the base station apparatus discards a certain amount of the coded bits after the channel coding in accordance with the size of the soft buffer memory of the mobile terminal apparatus which is capable of transmission and reception in the single component carrier.

* * * * *